UNITED STATES PATENT OFFICE.

JOHN B. COLES, OF BAYONNE, NEW JERSEY.

SLATING COMPOUND.

SPECIFICATION forming part of Letters Patent No. 485,455, dated November 1, 1892.

Application filed April 2, 1892. Serial No. 427,532. (No specimens.)

*To all whom it may concern:*

Be it known that I, JOHN B. COLES, of Bayonne, in the county of Hudson and State of New Jersey, have invented a new and useful Improvement in Slating Compounds, of which the following is a full, clear, and exact description.

My invention relates to an improvement in slating compounds adapted to impart to the various substances or articles to which it is applied a surface capable of being readily written upon by a lead-pencil or a like instrument, the surface being of such a nature that the marks made by writing or drawing upon the slated surface may be conveniently and expeditiously expunged from the surface by the use of water and a cloth, sponge, or the equivalent thereof.

A further object of the invention is to so improve upon the compositions of this nature as to produce a slated surface which will be white or but faintly colored and which will also be exceedingly smooth and practically polished.

The invention consists in the combination of ingredients to be hereinafter fully set forth, and pointed out in the claim.

The slating compound consists of soluble glass, alumina, water, and pearlash. These ingredients are combined in about the following proportions and in substantially the following manner: To about seven parts of liquid glass four parts of alumina or about five parts of water and one twenty-fifth part of pearlash are added, the latter acting as a true alkali or solvent. These ingredients are thoroughly commingled by well mixing them together, and the resultant product will be a compound of about the consistency of paint, and this paint is readily applied by means of a brush or otherwise to the surface of the article to be slated—as, for instance, bristol-board or paper. This compound when dried upon the article to which it is applied produces a smooth even surface, which is capable of being written upon by means of a lead-pencil and from which the pencil or other marks may be thoroughly erased and the surface be left without the trace of such marks.

I desire it to be understood that the essential feature of this invention consists of the application of mineral alumina to slating compounds and that the said alumina may be used with the formula heretofore described, or may be combined with other slating compounds—white, black, or colored—as a substitute for silicate of magnesium, oxide of zinc, talc, or powdered pumice-stone at present used in slating compounds. The result of the employment of the alumina in slating compounds is that a very great improvement is obtained in durability, erasible qualities, and marking qualities (tooth) of the finished slated surface.

Having thus described my invention, I claim as new and desire to secure by Letters Patent—

The herein-described slating compound, which consists of soluble glass, alumina, water, and pearlash, mixed in substantially the proportions stated and in the manner set forth.

JOHN B. COLES.

Witnesses:
R. I. CLARK,
HENRY C. COLES.